(No Model.)
E. B. PIKE.
BICYCLE ATTACHMENT.
No. 570,681. Patented Nov. 3, 1896.
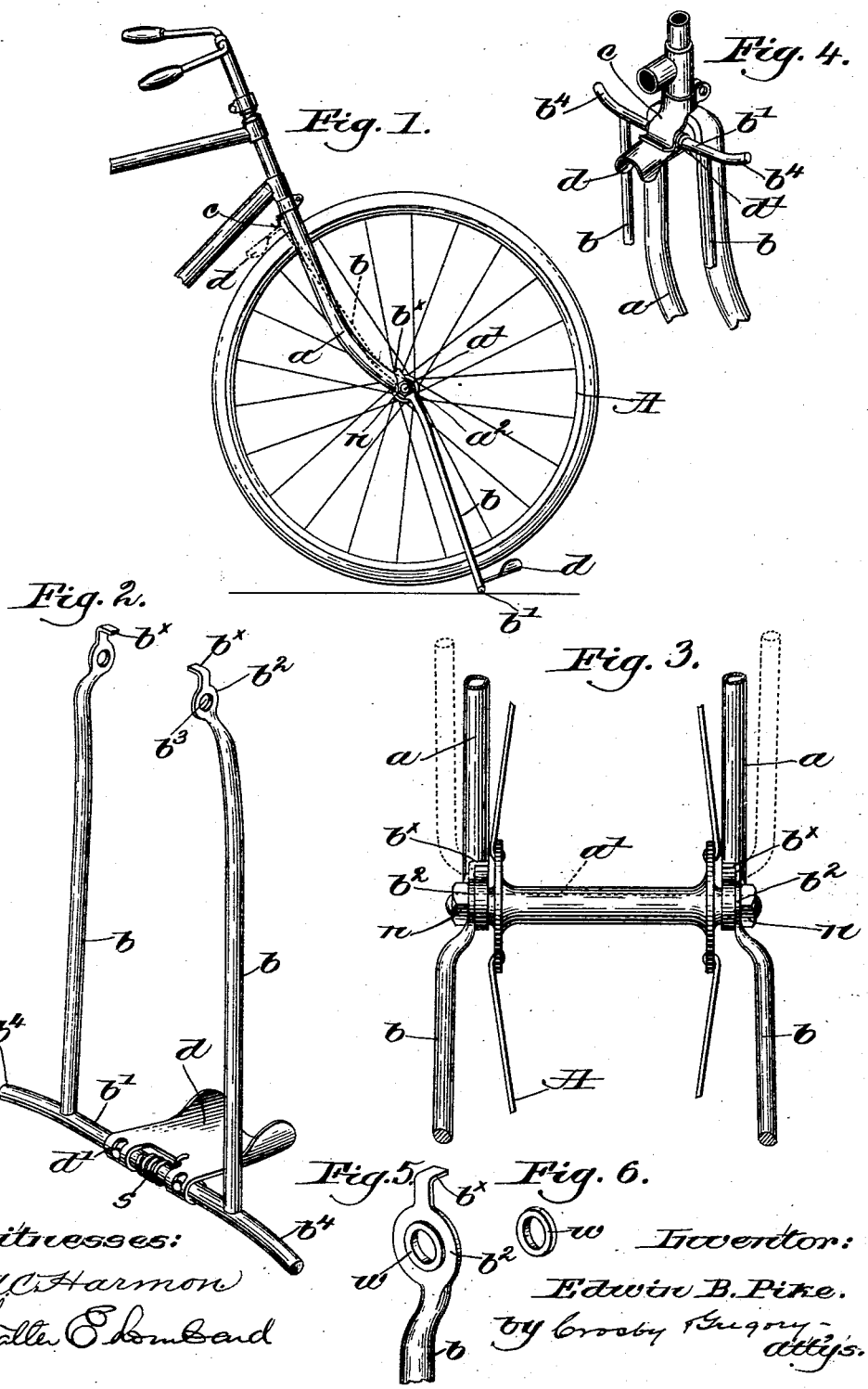
Witnesses:
A. C. Harmon
Walter E. Lombard
Inventor:
Edwin B. Pike.
by Crosby Gregory
attys.
THE NORRIS PETERS CO., PHOTO-LITHO., WASHINGTON, D. C.

UNITED STATES PATENT OFFICE.

EDWIN BERTRAM PIKE, OF HAVERHILL, NEW HAMPSHIRE.

BICYCLE ATTACHMENT.

SPECIFICATION forming part of Letters Patent No. 570,681, dated November 3, 1896.

Application filed December 21, 1895. Serial No. 572,852. (No model.)

*To all whom it may concern:*

Be it known that I, EDWIN BERTRAM PIKE, of Haverhill, county of Grafton, State of New Hampshire, have invented an Improvement in Bicycle Attachments, of which the following description, in connection with the accompanying drawings, is a specification, like letters on the drawings representing like parts.

This invention has for its object the production of a simple bicycle attachment applicable to any wheel of the well-known "safety" type, the attachment combining the functions of a stand or support, a foot-brake, and a foot-support in coasting.

The attachment can be instantly moved into position to serve as a stand or support or as a brake and foot-support, and is so light that its added weight is not noticed by the rider.

Figure 1, in side elevation, represents the front wheel, forks, and head of a safety-bicycle with one embodiment of my invention applied thereto, shown as a stand in full lines and in dotted lines in position when the bicycle is in motion. Fig. 2 is an enlarged perspective detail view of the attachment removed. Fig. 3 is an enlarged front elevation of the lower ends of the forks, the front-wheel axle, and the upper end of the attachment. Fig. 4 is a perspective detail showing one form of retaining device for retaining the attachment in place when the bicycle is in use. Fig. 5 is an enlarged perspective detail of one of the bearings for the attachment, and Fig. 6 is a similar view of one of the axle-washers upon which I prefer to mount the attachment.

The bicycle may be of any usual or well-known description, the front fork $a$, front wheel A, and its axle $a'$ being clearly shown as sufficient to enable my invention and its operation to be understood.

I have shown one form of the attachment separately in Fig. 2, it comprising two arms $b$ $b$, connected at one end by a cross-piece $b'$, the other ends of the arms being shown as inturned and enlarged at $b^2$, with holes $b^3$ therein to receive a washer or bushing $w$.

As best shown in Fig. 3, the attachment is applied to the bicycle by removing the axle-nuts $n$ $n$ from the front axle $a'$ and then slipping the ends projecting beyond the forks through the holes $b^3$ until the usual washers enter said holes, after which the nuts are replaced and tightened. The washers thus form bearings upon which the attachment can swing, the distance from the cross-bar $b'$ to the axle being somewhat greater than the wheel-radius.

The inner extremities of the arms $b$ $b$ are bent to form stops $b^\times$, adapted to rest against the front edges of the fork $a$, as shown in Fig. 1, when the attachment is used as a bicycle-support, the cross-bar $b'$ at such time resting on the ground or floor slightly in advance of and preferably lifting the wheel A from contact therewith. A steady support or stand is thus provided permanently attached to the bicycle and always ready for use, the attachment being made of tubing, if desired, for the sake of lightness and strength.

If the usual axle-washers should not be of the proper size to form bearings for the attachment, others could be readily substituted, the washers being firmly held between the outer sides of the fork and the retaining-nuts $n$.

When the bicycle is in use, the attachment is swung rearwardly and up into dotted-line position, Fig. 1, or as shown in Fig. 4, to be engaged by a suitable spring-clip $c$, which overlaps the cross-bar $b'$, the clip being secured to the top of the front fork.

Any other convenient or desired form of clip or detent may be used, the object being to provide a catch which will readily engage or which can be easily disengaged from the attachment.

I have made the cross-bar $b'$ long enough to project beyond the arms $b$, as at $b^4$, and when the cross-bar rests against the fork, as shown in Fig. 4, the ends $b^4$ serve as coasters or foot-rests upon which the rider can rest his feet when coasting.

The cross-bar $b'$ forms a most convenient support for a foot-brake, shown as a suitably-shaped metal shoe $d$, overturned about the cross-bar at $d'$, forming attaching-eyes, the shoe being held out of engagement with the wheel-tire by a suitable spring $s$.

When the brake is to be applied, the rider places his foot upon the shoe $d$, pressing it against the tire, thus obviating the use of the rider's shoe, a common method of braking now practiced by bicycle-riders.

One or both of the ears $d'$ is shown as slotted at $d^2$ to receive a pin 5, in the cross-bar $b'$, said pin serving to limit the rotative movement of the brake-shoe on the cross-bar, the action of the spring $s$ keeping the shoe against the stop when not in use.

I have thus combined in one attachment a stand, brake, and coasters, any function of the attachment being adapted for ready use, the arrangement being such that the brake does not interfere when the attachment is used as a stand, the coasters at such time broadening the base of and steadying the stand.

While I have shown a very simple, cheap, and efficient form of attachment, my invention is not restricted to the exact construction thereof, as obviously it may be modified in various particulars without departing from the spirit and scope of my invention.

Having fully described my invention, what I claim, and desire to secure by Letters Patent, is—

1. In a bicycle, a stand pivotally mounted thereon and adapted to form a support therefor when swung downwardly, a detent to retain the stand in inoperative position, and a brake-shoe mounted on the free end of the stand and adapted to brake the adjacent wheel when the stand is held by the detent, the brake-shoe at such time being located above the wheel-tire, substantially as described.

2. In a bicycle, a stand pivotally mounted thereon and adapted to form a support therefor when swung downwardly, a detent to retain the stand in raised, inoperative position, laterally-extended foot-rests on the free end of said stand, and a brake carried by the stand between the foot-rests, said foot-rests and brake being operative when the stand is held by the detent, substantially as described.

3. In a bicycle, a stand adapted to be pivotally mounted upon the front axle, a laterally-extended base for the stand, to serve as foot-rests when the stand is inoperative, a detent to retain the stand inoperative, and a brake carried by said stand, to coöperate with and brake the front wheel when the stand is held by the detent, substantially as described.

In testimony whereof I have signed my name to this specification in the presence of two subscribing witnesses.

EDWIN BERTRAM PIKE.

Witnesses:
FREDERIC G. DOW,
JOSEPH H. JONES.